United States Patent Office 2,730,581
Patented Jan. 10, 1956

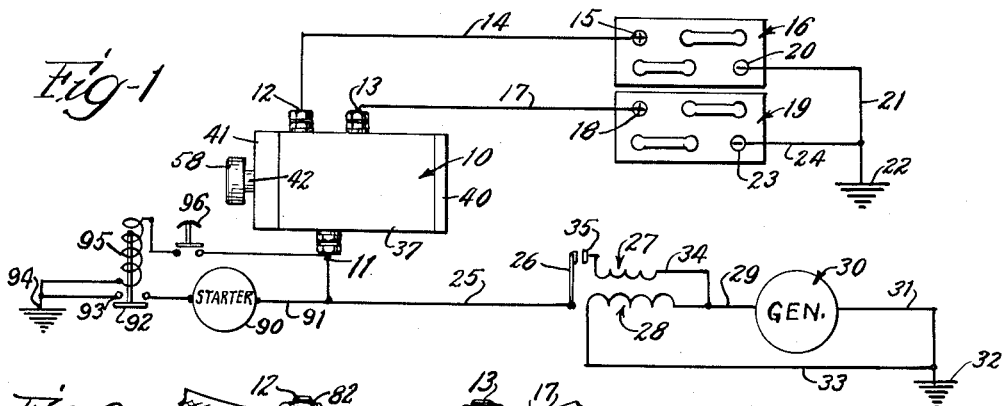

2,730,581

DUAL STORAGE BATTERY SWITCH

Peter Bruno, Chicago, Ill.

Application June 19, 1953, Serial No. 362,849

1 Claim. (Cl. 200—16)

The present invention relates to a dual storage battery system and an improved dual storage battery switch.

One of the objects of the invention is the provision of an improved system by means of which a motor vehicle or other battery system, which includes a generator and a starter or other load, may be provided with a pair of batteries and so connected that either battery may be charged or both batteries may be charged at the same time.

Another object of the invention is the provision of an improved dual battery system in which the user may use either one of the batteries or the user may use both batteries in parallel so that the battery which has the best charge may be used, or both batteries may be employed to give a maximum power and capacity for starting.

Another object of the invention is the provision of an improved dual storage battery system so that when battery efficiency is low, as in cold weather, both batteries can be placed in parallel for greater certainty in starting the motor.

Another object of the invention is the provision of an improved storage battery system which does not require any change in the usual charging starting circuits of an automotive vehicle other than the connection of two batteries in the circuit by means of the present dual storage battery switch.

Other objects and advantages of the invention will be apparent from the following description and the accompanying drawings, in which similar characters of reference indicate similar parts throughout the several views.

Referring to the single sheet of drawings accompanying this specification,

Fig. 1 is a wiring diagram of my dual storage battery system;

Fig. 2 is a sectional view taken through the dual storage battery switch on the plane of the line 2—2 of Fig. 3;

Fig. 3 is a top plan view of the switch;

Fig. 4 is a sectional view taken on the plane of the line 4—4, of Fig. 2, looking in the direction of the arrows.

Referring to Fig. 1, my dual storage battery switch is indicated in its entirety by the numeral 10, and it is preferably provided with one common terminal 11 and two battery terminals 12 and 13.

The battery terminal 12 is connected by conductor 14 to one of the battery terminals 15 of one storage battery 16. The switch terminal 13 is connected by conductor 17 to another terminal 18 of the second storage battery 19.

The terminals 15 and 18 of the batteries may either be positive terminals or the negative terminals, depending on the system employed in any particular automobile. As an example, I have chosen a system in which the negative is grounded but in some automobiles the positive may be grounded.

The other terminal 20 of battery 16 is connected by conductor 21 to ground at 22; and the other terminal 23 of battery 19 is connected by conductor 24 to ground at 22. The common terminal 11 is connected by conductor 25 to the movable or armature contact 26 of the cutout relay 27. The cutout relay has a coil 28 connected by conductor 29 to one terminal of the generator 30.

The other terminal of the generator 30 is connected by conductor 31 to ground at 32 and is also connected by conductor 33 to the other terminal of the coil 28. Conductor 29 is connected by conductor 34 to the contact 35 of the cutout relay 27.

Thus the switch 10 is in series with the generator and cutout relay and batteries through the ground connections 22 and 32. The two batteries 16 and 19 are in series with the generator but in parallel with each other.

The starter motor 90 is connected by conductor 91 to terminal 11 and to relay contact 92. Relay fixed contact 93 is connected to ground at 94 and to relay 95 and push button 96, which is connected to terminal 11.

Referring to Figs. 2 to 4, the dual storage battery switch 10 is preferably enclosed in a housing which may be rectangular in elevation, as seen in Fig. 4, and in plan.

The housing may consist of a pair of insulating side plates 36, 37 and a pair of insulating top and bottom plates 38 and 39, each of these being made of molded insulation or fiber of uniform thickness and rectangular in shape.

The housing is provided with a rear end plate 40, and a front end plate 41, the latter also serving as a guide for a plunger 42.

The side and top plates and the end plates are secured together by a plurality of screw bolts 48 threaded into the edges and ends of the adjacent plates. This provides the housing with a contact chamber 43 of substantially rectangular shape in section and uniform in cross section throughout for reception of a sliding contact 44.

The sliding contact 44 may consist of a rectangular block of copper or other high conductive metal which slides in the chamber 43 with a suitable clearance, and the block is preferably provided with rounded corners 45 for sliding over the fixed contacts.

Block 44 is preferably provided with a cylindrical through bore 46, for receiving the end of the cylindrical plunger rod 42 to which the block may be secured by means of a countersunk screw bolt 47, which is countersunk in the block 44 and threaded into the plunger 42.

The cylindrical plunger 42 slides in a bore 49 in the end plate 41 and is provided with a plurality of partially spherical sockets 50—53, located on the plunger 42, as shown in Fig. 2, to hold the contact 44 in any of four different positions.

The partially spherical sockets 50—53 are engaged by a ball detent 54 which is mounted in a transverse bore 55 in the end plate 41, and urged by spring 56 which is backed up by a screw bolt 57 against which it reacts.

The plunger 42 is provided with a handle or head 58, which may be cylindrical in shape and which may have a bore 59, mounted on a reduced portion 60 of the plunger 42. The handle 58 is preferably made of insulating material and is secured by means of a washer 61, and a threaded screw bolt 62.

The bottom plate 39 is provided with a recess 63 which may be rectangular in plan for slidably receiving the spring pressed contact 64 comprising a rectangular block of copper.

The contact 64 also has its rear corner 65 rounded or beveled to engage the beveled parts 45 of the plunger contact 44. Contact 64 has a threaded bore 66 centrally located and provided with a threaded connector stud 67 threaded into it and slidably mounted in bore 68.

Contact 64 also has two bores 69, registering with bores 70 in the bottom plate 39 for receiving the compression springs 71, which urge the contact 64 inward.

The connector stud 67 is provided with a washer 72 and has a threaded end portion 73 provided with a pair of nuts 74, 75, used for clamping the conductor 25.

The nut 74 is so adjusted that it prevents the contact 64 for moving inward beyond the position shown in full lines in Fig. 2, but the stud 67 slides in a slightly enlarged bore 68, so that the contact 64 may be pressed inward by the plunger contact 64 against the spring 71; and sufficient universal movement is permitted by the enlarged bore 68 for the two contacts 64 and 44 to engage each other flatly under pressure by springs 71, with a maximum area of contact engagement.

The upper plate 38 is provided with a pair of rectangular recesses 76, 77, arranged oppositely to the recess 63 for slidably receiving the contact blocks 78, 79 which are rectangular and slidably mounted in the recesses. Sufficient clearance is provided between these blocks and their recesses and between the block 64 and its recess to permit tilting movement of these blocks to secure good contact engagement.

Block 78 is provided with a connector stud 80 threaded into a threaded bore 81 and extending through an enlarged bore 82 in the top plate 38. Block 79 is provided with a connector stud 83 threaded into a threaded bore 84, and slidably mounted in a bore 85 in the top plate 38.

Springs 86 are mounted in registering sockets 87 and 88, there being two springs for each block 78 and 79 substantially as described for block 64. Blocks 78 and 79 are provided with similar washers and nuts for securing the conductors 14 and 17, and for limiting the inward movement of the blocks 78 and 79. Blocks 78 and 79 have rounded corners 89 for engaging the rounded corners 45 of the plunger block 44.

The contact block 44 may be as along as the contacts 78 or 79, thus giving full contact area engagement between block 44 and either of the contacts 78 or 79.

The contact 64 may extend from the left side of contact 78 to the right side of contact 79 in Fig. 2. Thus the common contact 64 is of sufficient length to give full engagement with the block 44 when it is in position to engage either of the contacts 78 or 79.

In the intermediate dotted line position the block 44 engages both the contacts 78 and 79 but each of these contacts conducts only half as much current.

The length of the casing of the switch 10 is preferably sufficient so that block 44 may be moved to the right-hand full line position where it is out of contact with any of the contacts, placing the batteries all on open circuit.

The spherical depressions or sockets 50—53 are located to index the switch block 44 and accurately locate the block in position to engage contact 78, both contacts 78 and 79, contact 79, or on open circuit position.

The operation of my system and switch is as follows:

When the switch is on open circuit in the full line position of Fig. 2, this is useful to cut out the batteries entirely in situations where some element of the circuit has become short circuited, such as the automobile horn; or the user may have the switch 10 located in a secret place and it will then be very difficult for any unauthorized person to start the car. The circuit will act as though the battery is dead and this may deter any car thief from going farther.

When the switch is in the position engaging contact 78 the generator charges only the battery 16 and it is only the battery 16 which is used to operate the starter motor 90.

When the switch is in the position engaging the contact 79 alone, the generator charges only the battery 19 and only the battery 19 is being used to drive the starter motor. Thus the driver may change the switch at will to charge the weaker battery and to drive the starter motor with the stronger battery.

In the event it is decided to keep both batteries charging, the switch is placed in the intermediate position engaging both the contacts 78 and 79, and the capacity of both batteries is thus available to energize the starter motor.

This may be desirable in the winter time when the oil is cold and heavy and the batteries may be weaker because of difficulties of starting.

It will thus be observed that I have invented an improved dual storage battery system and switch by means of which either or both batteries may be charged; and either or both batteries may be used for starting, and by means of which theft of the car may be prevented, whenever the person seeks to steal the car by driving it away.

While I have illustrated a preferred embodiment of my invention, many modifications may be made without departing from the spirit of the invention, and I do not wish to be limited to the precise details of construction set forth, but desire to avail myself of all changes within the scope of the appended claim.

Having thus described my invention, what I claim as new and desire to secure by Letters Patent of the United States, is:

An electric storage battery switch for carrying heavy starter motor currents, comprising an insulating housing having four rectangular side walls and two rectangular end walls secured together to form a rectangular chamber in said housing, a manually movable contact in said housing in the nature of a moving contact of wide range and a plurality of additionally spring pressed contacts radially movable with respect to said manually movable contact mounted in said housing in the nature of fixed contacts with relatively small range of movement, all of said spring pressed contacts being mounted on plungers slidably mounted in cylindrical bores in said side walls, and all of said contacts comprising solid blocks of highly conductive metal, said manually movable contact comprising a rectangular block with rounded corners carried by an elongated plunger extending through one of the end walls and movable from end to end of said chamber, said elongated plunger having a plurality of ball sockets, and said latter end wall having a spring pressed ball for holding said elongated plunger in any of three positions, the plungers of said spring pressed contacts each being provided with a plurality of nuts mounted on threaded ends for connection to conductors, said nuts limiting inward motion of the spring pressed contacts, said spring pressed contacts each being urged inwardly by compression springs symmetrically arranged in each contact in registering bores extending partially into each spring pressed contact and the adjacent side wall, causing the spring pressed contacts to project into said chamber into engagement with the movable contact, said spring pressed contacts including one elongated member for engagement in two positions, and two short members, each of which engages the movable contact in one position, said chamber having an insulated end portion where the movable contact is on open circuit and not in contact with any of said spring pressed contacts.

References Cited in the file of this patent

UNITED STATES PATENTS

| | | |
|---|---|---|
| 1,288,938 | Leonard | Dec. 24, 1918 |
| 1,290,701 | Berger | Jan. 7, 1919 |
| 1,656,562 | Jones | Jan. 17, 1928 |
| 1,671,196 | Larson | May 29, 1928 |
| 1,898,370 | Hughes et al. | Feb. 21, 1933 |
| 2,085,275 | Schmidt | June 29, 1937 |
| 2,096,378 | Mitchell | Oct. 19, 1937 |
| 2,152,405 | Dreischerf | Mar. 28, 1939 |
| 2,226,850 | Foster | Dec. 31, 1940 |
| 2,335,526 | Mitchell | Nov. 20, 1943 |
| 2,564,957 | Cermak | Aug. 21, 1951 |
| 2,575,147 | Unsworth | Nov. 13, 1951 |

FOREIGN PATENTS

| | | |
|---|---|---|
| 654,470 | France | Nov. 29, 1928 |